United States Patent [19]

Martin et al.

[11] Patent Number: 5,080,481
[45] Date of Patent: Jan. 14, 1992

[54] SCREEN SIMULATOR WINDOW

[75] Inventors: Donald L. M. Martin, Mosman; Keith W. Kanaar, Gymea; Robert W. G. MacDonald, Templestowe, all of Australia

[73] Assignee: Arnotts Biscuits Limited, New South Wales, Australia

[21] Appl. No.: 466,258

[22] PCT Filed: Mar. 30, 1989

[86] PCT No.: PCT/AU89/00135
§ 371 Date: Jan. 29, 1990
§ 102(e) Date: Jan. 29, 1990

[87] PCT Pub. No.: WO89/09431
PCT Pub. Date: Oct. 5, 1989

[30] Foreign Application Priority Data
Mar. 30, 1989 [AU] Australia ............... PI7544

[51] Int. Cl.⁵ .................. G03B 21/10; G03B 21/56
[52] U.S. Cl. ...................... 353/122; 353/79; 359/446; 359/449
[58] Field of Search ........... 353/79, 62, 71, 77, 353/78, 122, 74; 350/120, 123, 117

[56] References Cited
U.S. PATENT DOCUMENTS 2,132,904 10/1938 Martinez ............... 350/120
2,511,702 6/1950 Elian .................. 350/120
3,198,066 8/1965 McGhee ................ 350/120
3,316,053 4/1967 Giacometti ............ 350/120
3,480,346 11/1969 Reitz et al. .......... 350/120
3,741,638 6/1973 Geary ................. 353/122
4,167,311 9/1979 Pund .

FOREIGN PATENT DOCUMENTS 147404 7/1920 United Kingdom .
167340 8/1921 United Kingdom .

Primary Examiner—William A. Cuchlinski, Jr.
Assistant Examiner—William C. Dowling
Attorney, Agent, or Firm—Armstrong, Nikaido, Marmelstein, Kubovcik & Murray

[57] ABSTRACT

A screen simulator window having a window aperture through which a scene may be viewed with a partial screen arranged immediately behind the window. The screen consists of alternately opaque screen portions and transparent screen portions. The adjacent screen portions are transposed at a speed such that the presence of the screen is not apparent to the eye of the viewer. A projector projects a scene onto rear sections of the opaque screen portions extending away from the window. A mirror behind the partial screen is viewable through the window. The scene projected onto the rear surface of the opaque screen portions is visible in the mirror and viewable through the window.

9 Claims, 11 Drawing Sheets

SCREEN SIMULATOR WINDOW

TECHNICAL FIELD

The present invention relates to a screen simulator window, the object of which is to provide to persons viewing the window a realistic simulation of apparent surroundings and events.

Simulators are currently used mainly for the training of service personnel particularly aircraft pilots, the simulator being arranged so that the person concerned looking into the simulator window sees a fairly realistic representation of a scene that has been previously recorded on film or video tape. Simulators at present in use are generally suitable for viewing only by one or a very small number of persons and, owing to the light losses involved in such systems relatively low levels of illumination can be a further limitation.

The object of the present invention is to provide a screen simulator window which can be viewed by a relatively large number of persons to provide enhanced realism with less limitations on brightness. It is also the object of the invention to provide a simulator window which increases the capacities and enhances the imagery of conventional simulator windows while reducing the cost of construction.

Simulator windows according to the invention may be applied in a variety of ways. One example is an enclosed cabin or capsule having front and side windows with provision for seating a number of people who may be called upon to imagine themselves in a bus, train, aeroplane, submarine or space capsule. In each of the windows a suitable scene is presented so that, to the persons in the cabin it appears that they are making a journey on land, under the sea or in space. In another application the window may be used as part of a flight simulator or racing car simulator or the like.

DISCLOSURE OF THE INVENTION

The present invention consists in a screen simulator window comprising, means defining a window aperture through which a scene may be viewed; a partial screen arranged immediately behind the window, the screen consisting of alternate opaque screen portions and transparent portions; means to cause adjacent screen portions and transparent portions to be transposed at a speed such that the presence of the screen is not apparent to the eye of a viewer, the surfaces of the screen portions directed away from the window being suitable for the reception of a projected image; a projector arranged to project a scene onto the said surfaces of the screen portions of the screen so that light from the projector is not directly visible to a viewer of the window, the projected scene appearing on the screen portion; and a mirror arranged behind the partial screen viewable through the window, the scene projected onto the partial screen being visible in the mirror through the window.

The partial screen used in the screen simulator window according to the present invention may be constructed in a number of different ways. In one embodiment of the invention the partial screen comprises a plurality of spaced apart slats defining between them a series of openings moved continuously past the window or oscillating in front of it up and down or side to side. In another embodiment a continuous screen is provided with an array of spaced apart cut-outs, transparent portions or gaps or a chequerboard array of screen and transparent portions. In a still further embodiment the screen comprises a rotating disc comprising a series of screen segments separated by gaps or transparent segments.

In yet a further embodiment the partial screen comprises an array of parallel slats each mounted to rotate about a longitudinal axis parallel to the longitudinal axis of the slat but lying outside the slat. In order to remove flicker, shadows and moire effects it is desirable that the transparent and screen portions of the screen are transposed at a rate of at least 45 per second and more preferably 60 per second.

It is advantageous that the screen and the mirror lie in substantially parallel planes in side by side array. This may be conveniently achieved if the screen is formed of a sheet of transparent material such as glass coated with a coating such as galenium arsenide which may be electrically rendered opaque or transparent. This would allow for zones of the screen to be intermittently switched between being transparent portions and being screen portions of the screen. The development of a coating which may be switched between being reflective and being transparent would allow the mirror be formed in a planar form similar to that of the screen.

The mirror may be a complete mirror however in preferred embodiments of the invention the mirror is either a moving partial mirror having reflective and non-reflective portions or is a one way, or partial, mirror. In particularly preferred embodiments of the invention the mirror is a moving segmented mirror shaped to have lens properties when moving. If the mirror is a moving mirror having sequential reflective and non-reflective portions it is essential that the alternating non-reflective portions of the mirror are in register with the screen portions of the screen such that light from the projector is not directly visible to a viewer of the window.

It is desirable that a lens be interposed between the screen and a viewer in the event that the mirror is not itself curved such that it has its own lens properties. The presence of such a lens can be used primarily to place the image apparently at visual infinity.

It is essential to the present invention that the image projected from the projector is formed firstly on a partial screen which image is then reflected by a mirror to the viewer. The mere reflection of an image onto a partial screen will not provide the advantages of the arrangement according to this invention. These advantages are, in preferred embodiments of the invention, as follows:

i) images may be viewed comfortably, precisely and in appropriate perspective from relatively close proximity and almost any angle;

ii) the position of the image can appear to be clearly contiguous with the sides of the window aperture not at a distance outside the window;

iii) it is not possible to see past, around, behind or between the image and the surrounding sides of the window aperture; and iv) the image size is the size of the viewing window not a larger size further away; consequently equipment costs and dimensions are reduced substantially.

The projector may be any conventional projector using ordinary or laser light. The image may be prerecorded on film or tape or may be a "live" projection of an event taking place at a distance.

BRIEF DESCRIPTION OF THE DRAWINGS

The invention may be embodied in a variety of different forms and in order that the nature of the invention may be better understood a plurality of such forms are described by way of example in the accompanying diagrammatic drawings in which.

BEST MODE FOR CARRYING OUT THE INVENTION

It is to be emphasized that the drawings described above are purely diagrammatic and are for the purpose of explaining the principles of the invention. In the following description similar parts in different embodiments of the invention are given the same numbers.

Figure 1:
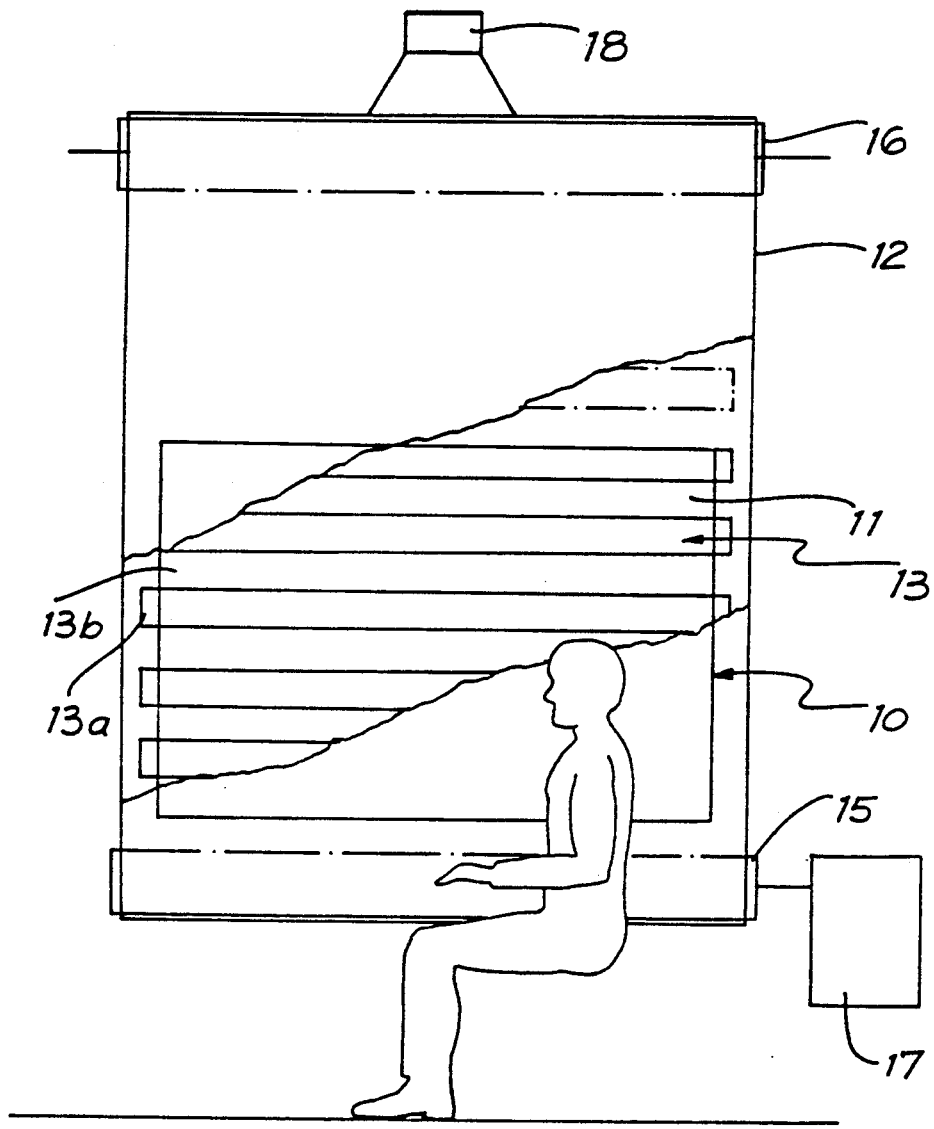
FIG. 1 is an elevation showing a person seated by the side of a screen simulator window according to the invention.

In FIG. 1 a seated figure is seen at one side of the window opening 10 which may be considered as constituting a side window of a cabin in which a number of persons are seated. In practice the cabin would have window openings at the front and at each side.

Immediately behind the window opening 10 is a window 11 of polarising glass and arranged behind this a light box 12 within which is a slatted screen 13 consisting of alternate horizontal slats 13a separated by gaps 13b, the gaps being in this case of equal width. The screen 13 is carried on bands 14 of flexible material which pass over upper and lower pulleys, 15 and 16 respectively, the lower pulley 15 being rotated by a motor 17 so that the screen 13 passes across the window opening 10 at a speed such that its slatted nature is not apparent to the eye of a person in the cabin. A variable axis film or other projector 18 is arranged to project an image into the screen 13 in the manner illustrated in FIG. 2, the projector 18 being out of sight of persons seated in the cabin. It will be seen that rays of light from the projector must pass through the rearmost run of the screen 13 before striking the rear of the slats of the run adjacent the window 11. This results in a substantial loss of light from the projector and in order that the viewed scene shall appear to be adequately illuminated a very powerful projector, for example of the order of 5 kilowatts is required. The scene projected onto the rear of the slats of the front run of the screen is visible through the window 11 in the mirror 19.

The arrangement shown in FIG. 2 has the inherent disadvantage that a person in the cabin looking upwardly or downwardly will see parts of the apparatus above or below the mirror thus destroying the realism of the presentation. With a view to avoiding this the mirror 19 is constructed as shown in FIG. 3, that is to say in the form of a number of radially extending elements arranged on the surface of a cone. In this case the mirror is rotated by means of the motor 21. With this arrangement even if a viewer looks upwardly or downwardly the projected scene will still be seen in the mirror which is rotated at a speed such as to give the appearance of a complete mirror.

Figure 2:
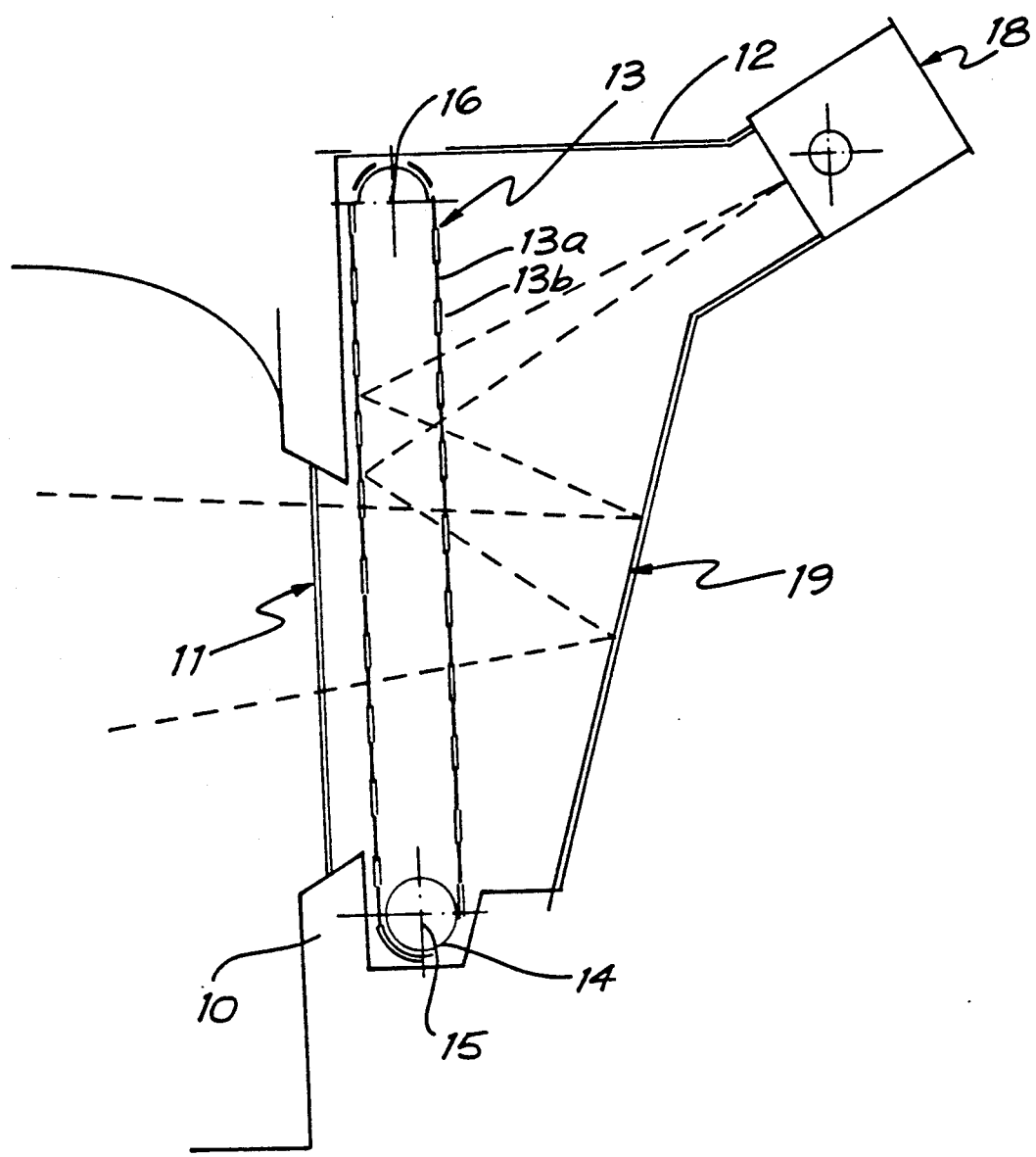
FIG. 2 is a sectional view of the screen simulator window of FIG. 1.
Figure 3:
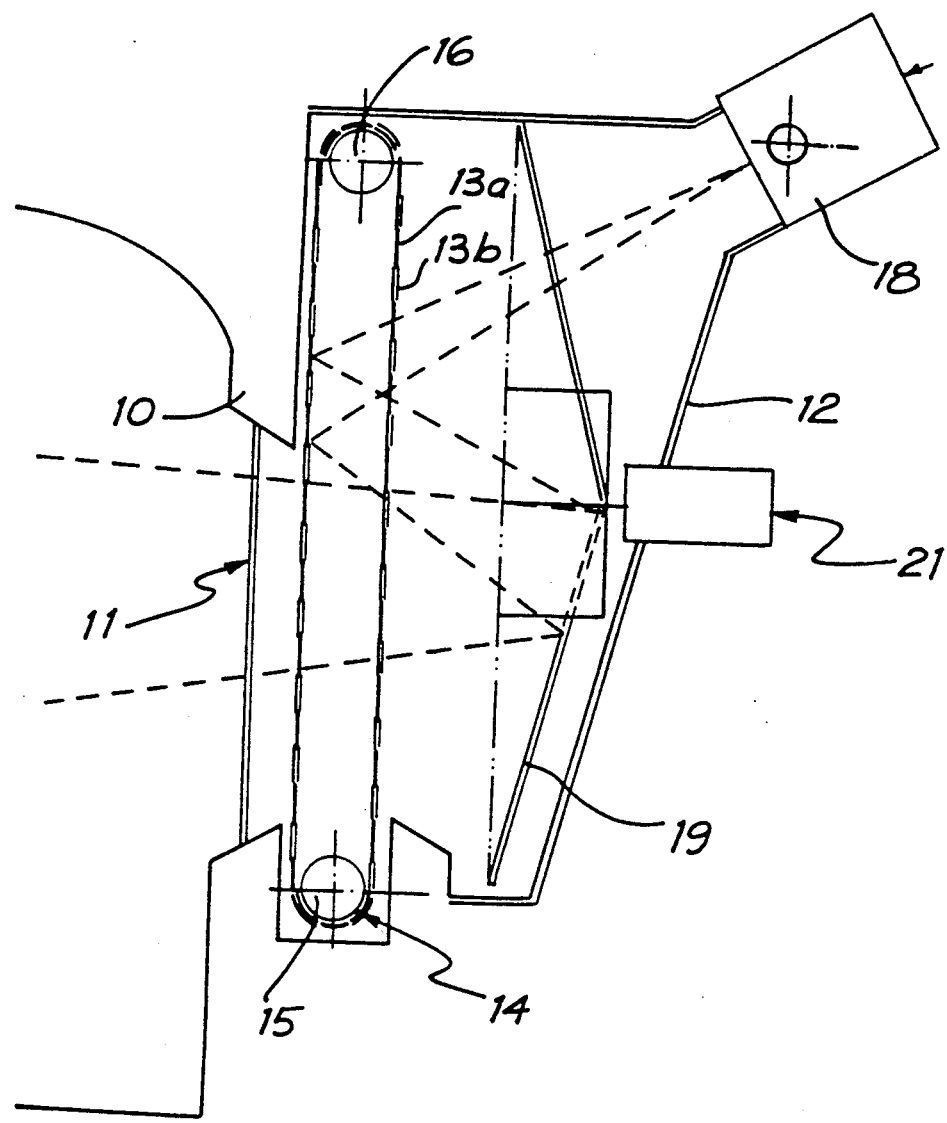
FIG. 3 is the sectional view of a modified form of the invention illustrating the use of a rotating mirror.
Figure 4:
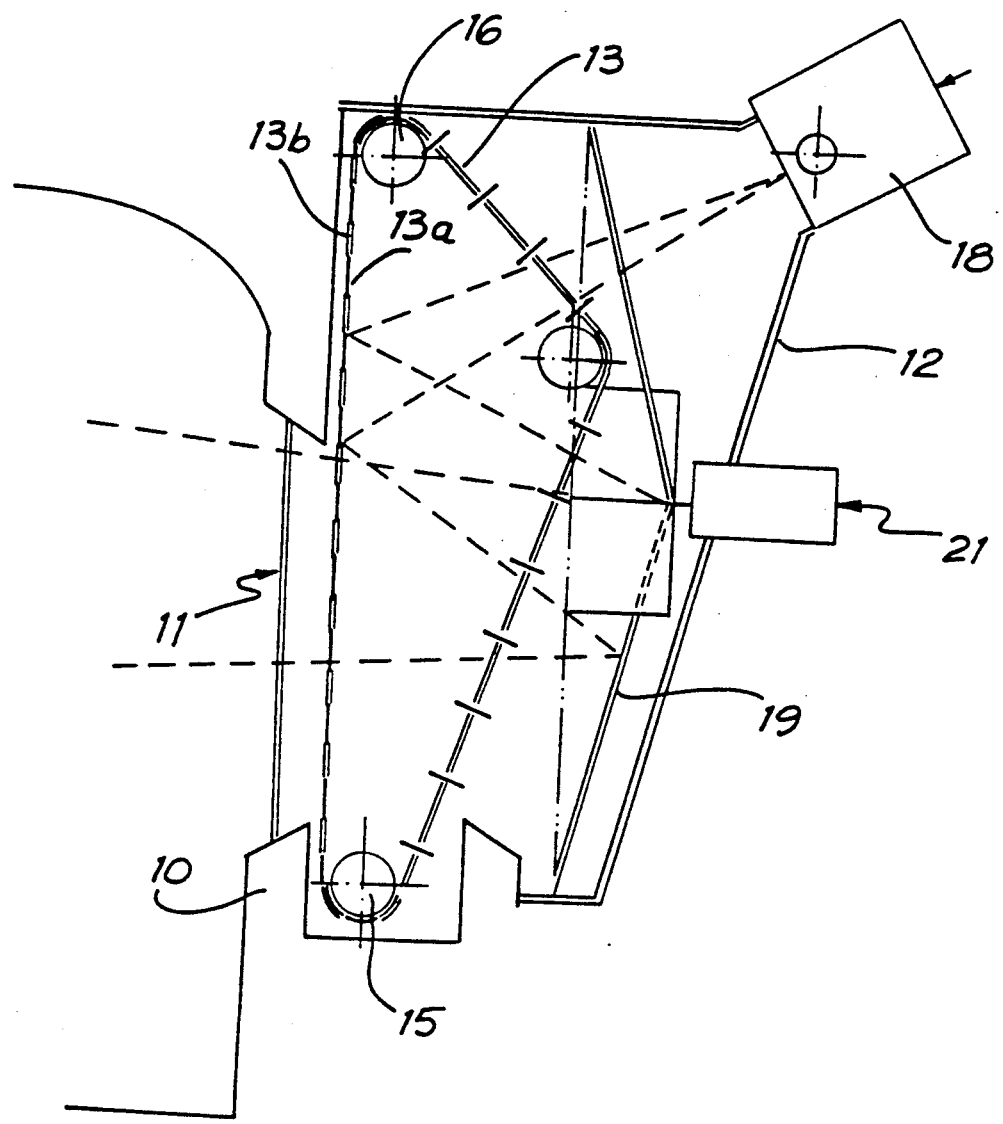
FIG. 4 is a similar view of a still further form of the invention.

With the arrangement shown in FIG. 2 there is a very considerable loss of light due to the necessity for the light from the projector to pass through the run of the slatted screen 13 remote from the mirror. FIG. 4 shows an arrangement corresponding to that of FIGS. 2 and 3 in which light loss is reduced by the provision of means (not illustrated) which have the effect of rotating the slats of the screen through 90° so that there is less interference with the light from the projector by the return run of the slatted screen. The cost of this however is greater complication and more noise in operation.

Figure 5:
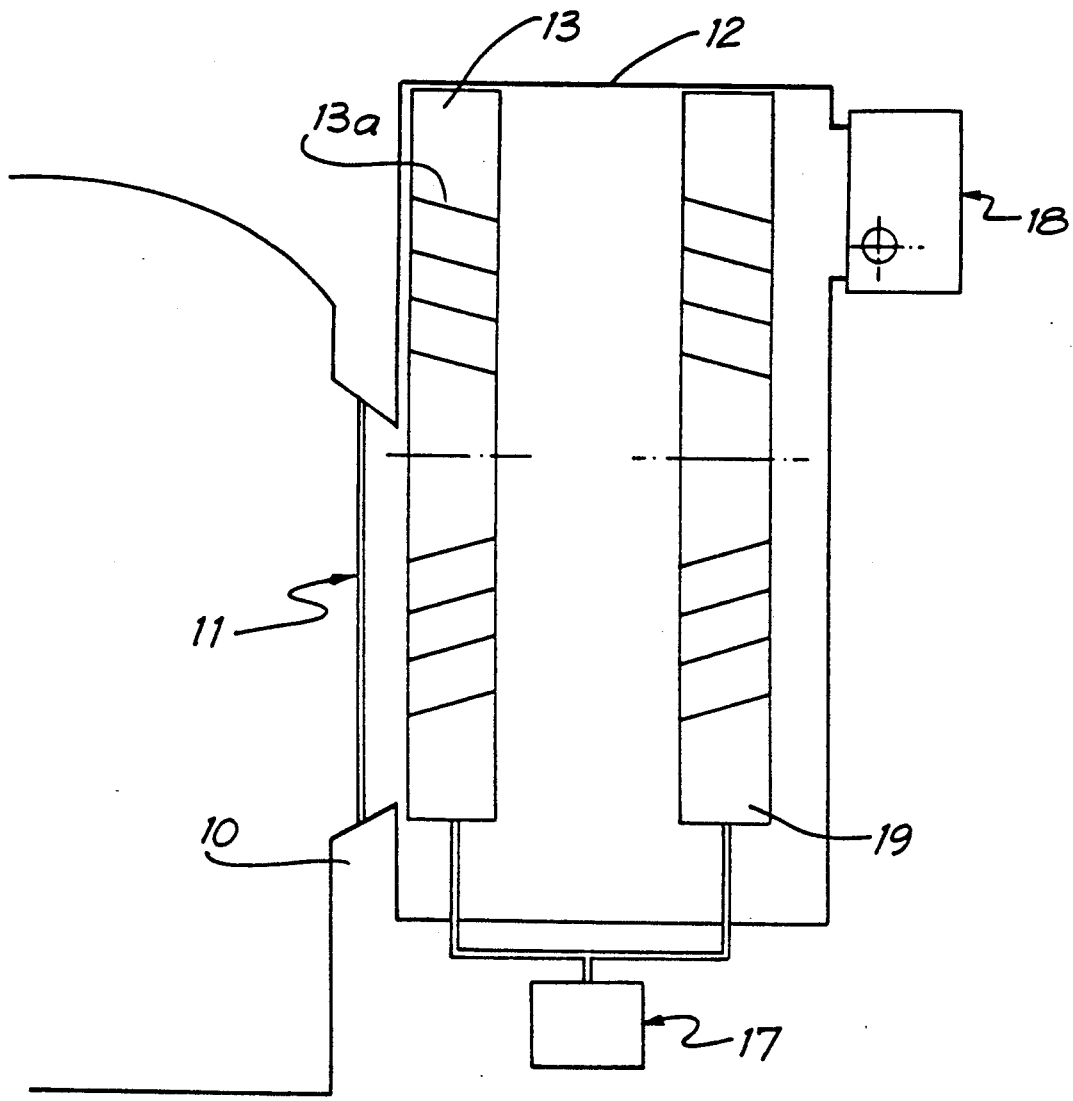
FIG. 5 is a sectional view showing the use of a rotating mirror and a rotating screen.
Figure 6:
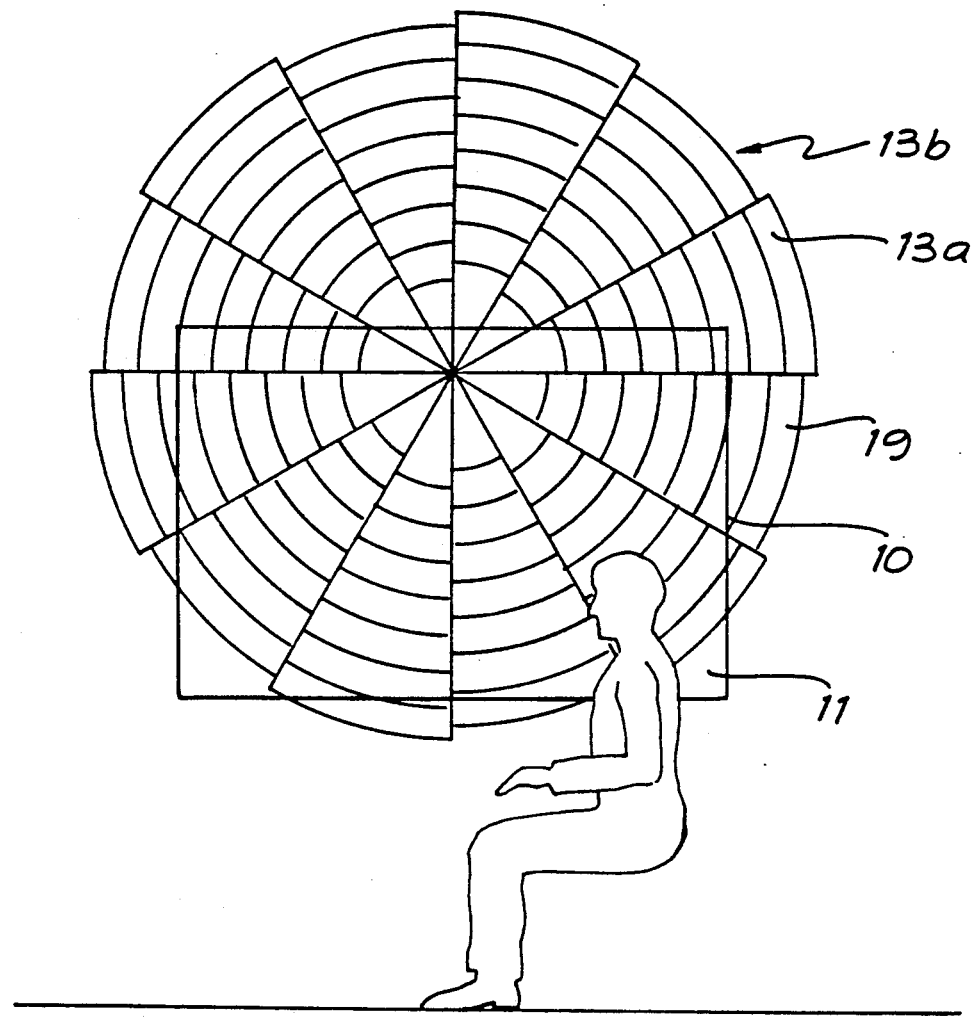
FIG. 6 is a view in elevation of the arrangement shown in FIG. 5.

FIGS. 5 and 6 show a more refined embodiment of the invention in which both the slatted screen and the mirror are purely rotary elements. The principle of operation is the same as that described above. In this case however the screen slats are carried in a wheel which is rotated by the motor 17 which also rotates the mirror. As in the previous embodiment the faces of the slats pointing away from the window are coated with a material suitable for a projection screen and the scene projected from the projector 18 is seen reflected in the elements of the mirror 19. In this case the beam from the projector 18 must pass through the mirror elements 19 and these are therefore in the form of half silvered mirrors which permit both transmission and reflection of light.

Figure 7:
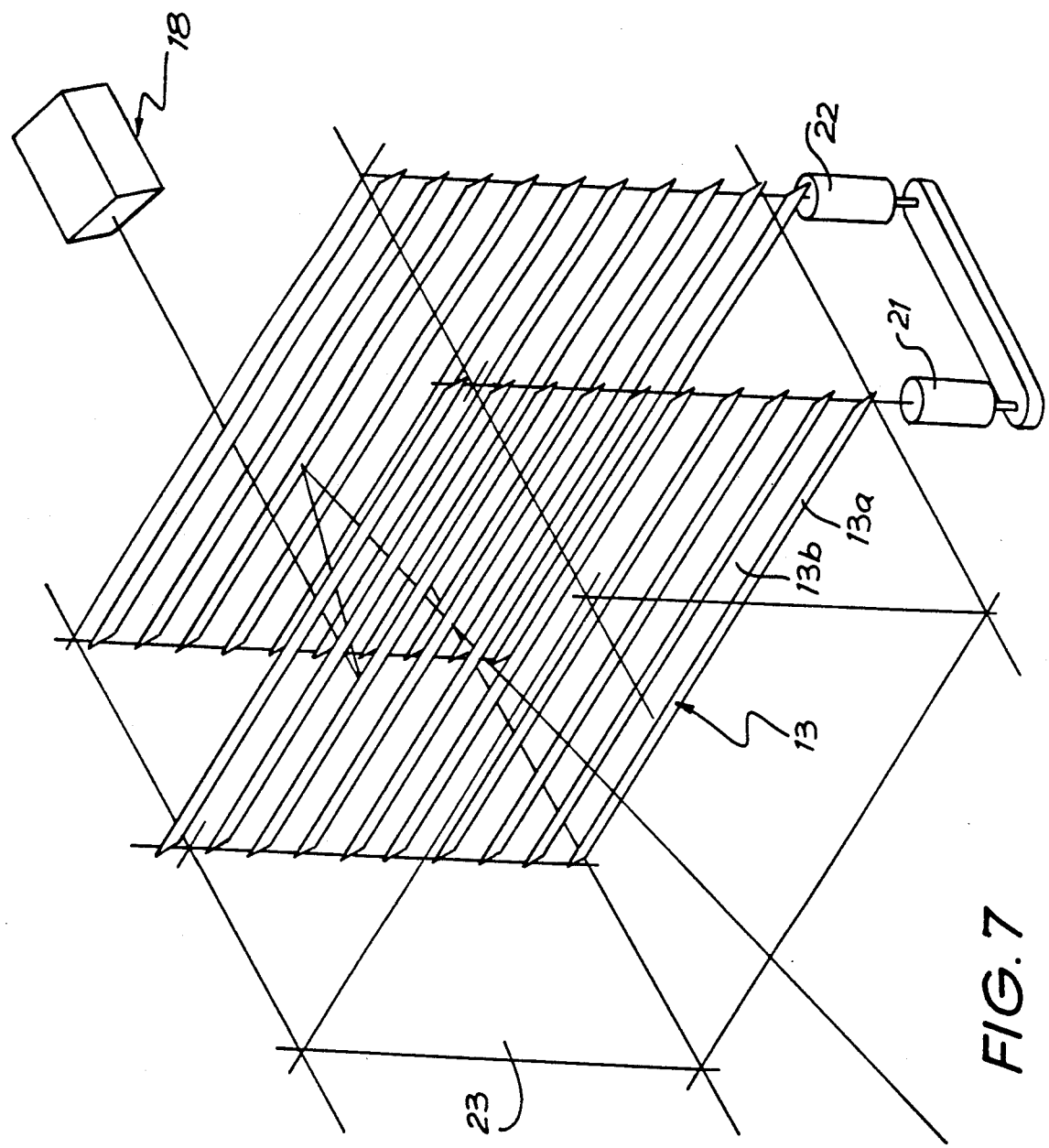
FIG. 7 is a diagrammatic perspective view of a further embodiment of the present invention.

FIG. 7 shows an arrangement in which the screen 13 and the mirror 19 are each made up of an array of angled slats. A pair of motors 21 and 22 cause the slats of the screen 13 and of the mirror 19, respectively, to oscillate in a vertical direction in synchrony. A lens 23 is positioned in front of the screen 13 to improve the sharpness of the image and its depth of field.

Figure 8:
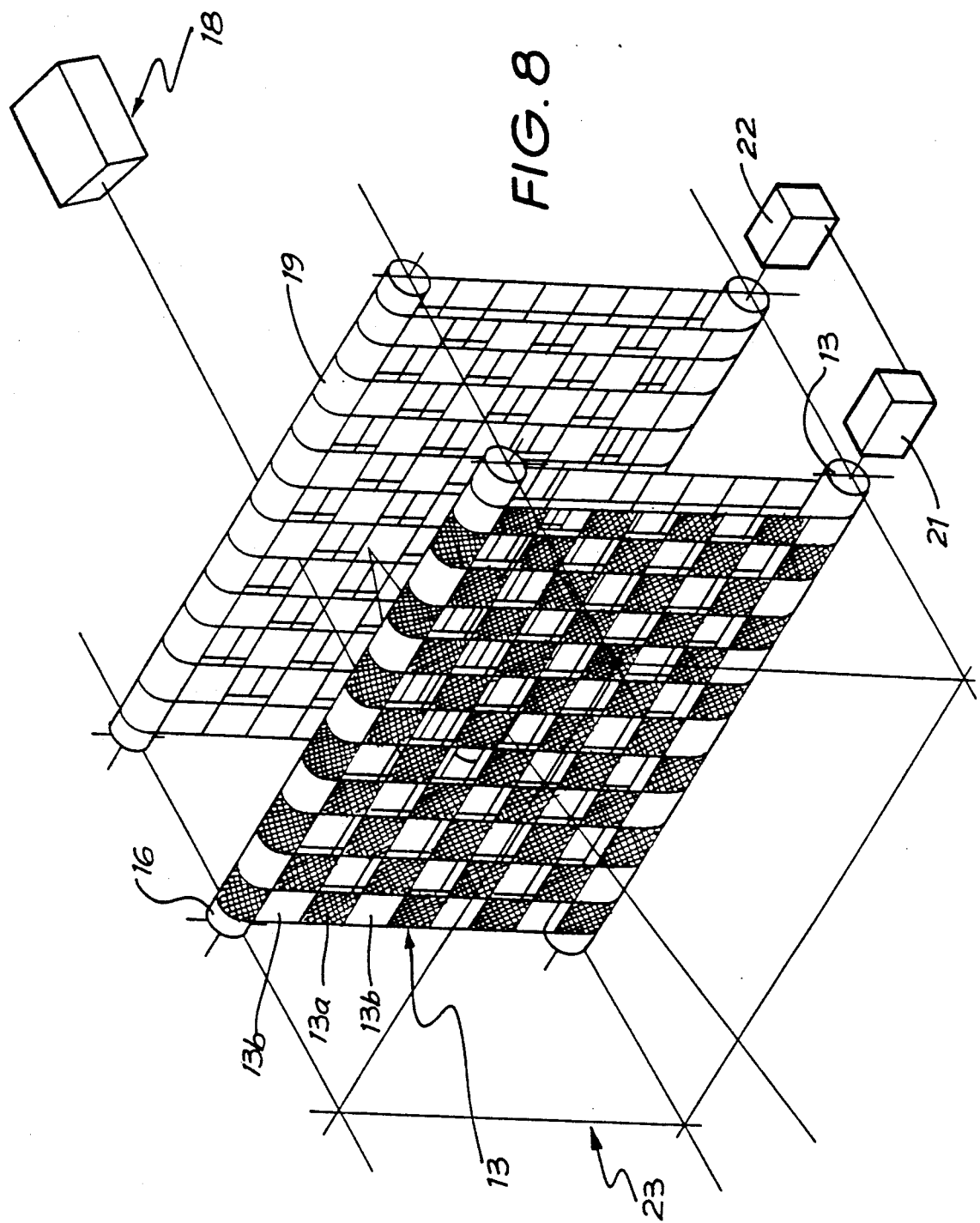
FIG. 8 is a similar view of a further embodiment of the invention.

FIG. 8 shows an arrangement in which the screen 13 and the mirror 19 are each comprised of continuous bands carrying a chequerboard matrix of transparent and opaque portions. The opaque portions 13a of the screen 13 are coated with a screen material while those of the mirror 19 are reflective. Motors 21 and 22 rotate rollers carrying the screen 13 and the mirror 19 in synchrony.

Figure 9:
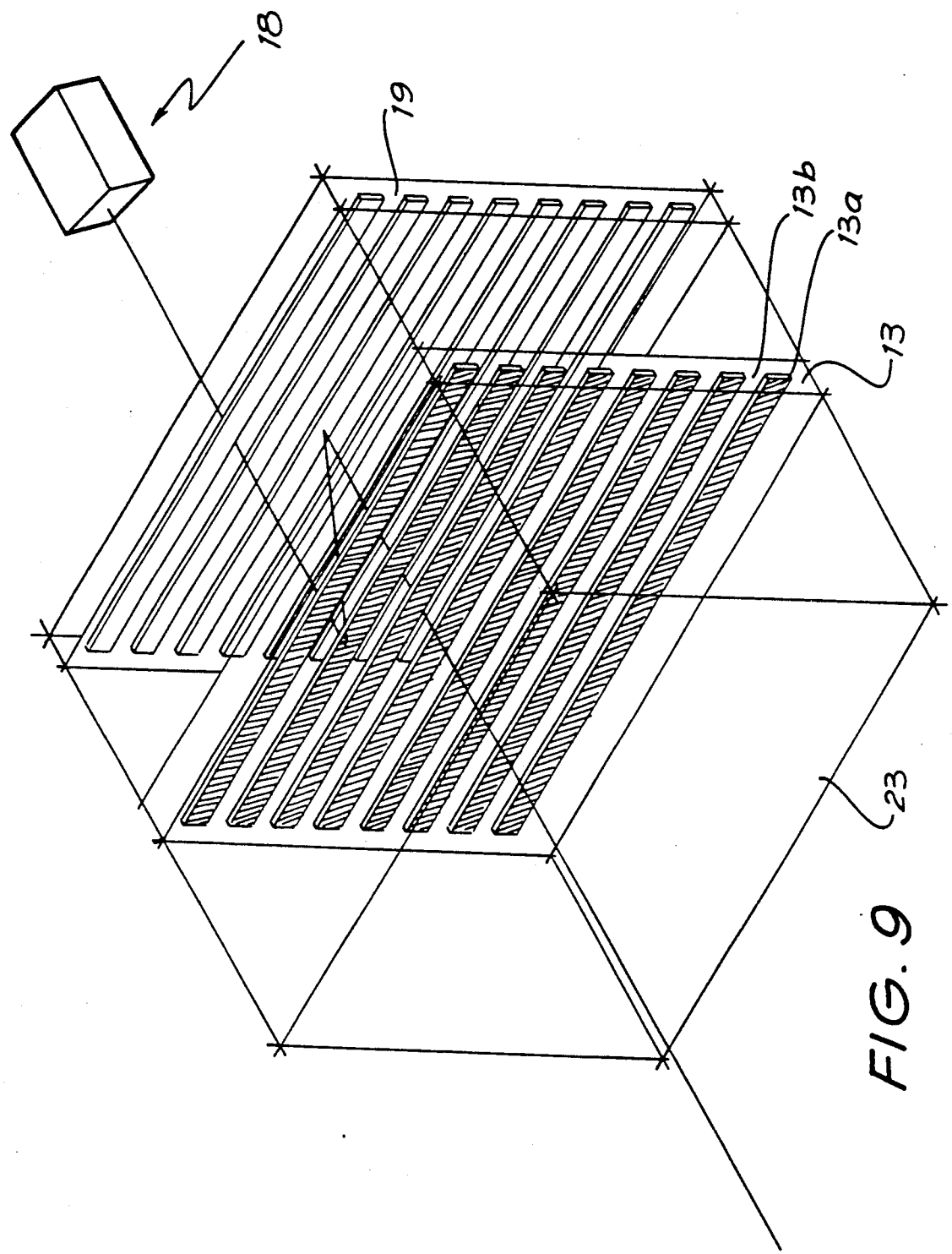
FIG. 9 is a similar view of a still further embodiment of the invention.

In the arrangement shown in FIG. 9 the screen 13 and the mirror 19 are each formed of a glass sheet coated with a film of a galenium arsenide material capable of being selectively rendered opaque or transparent by an electric current or voltage change. In the case of the screen 13 the film is rendered opaque to form screen portions 13a and rendered transparent to form the transparent portions 13b. In the mirror 19 the film is such that it is reflective when it is rendered opaque. In each case by alternating the current and or voltage appropriately the adjacent opaque and transparent portions may be transposed. Obviously the transposition of the opaque and transparent portions of the screen 13 will alternate with the transposition of those portions of the mirror 19 so that at no time can light from the projector 18 fall directly onto a viewer viewing the image through lens 23.

Figure 10:
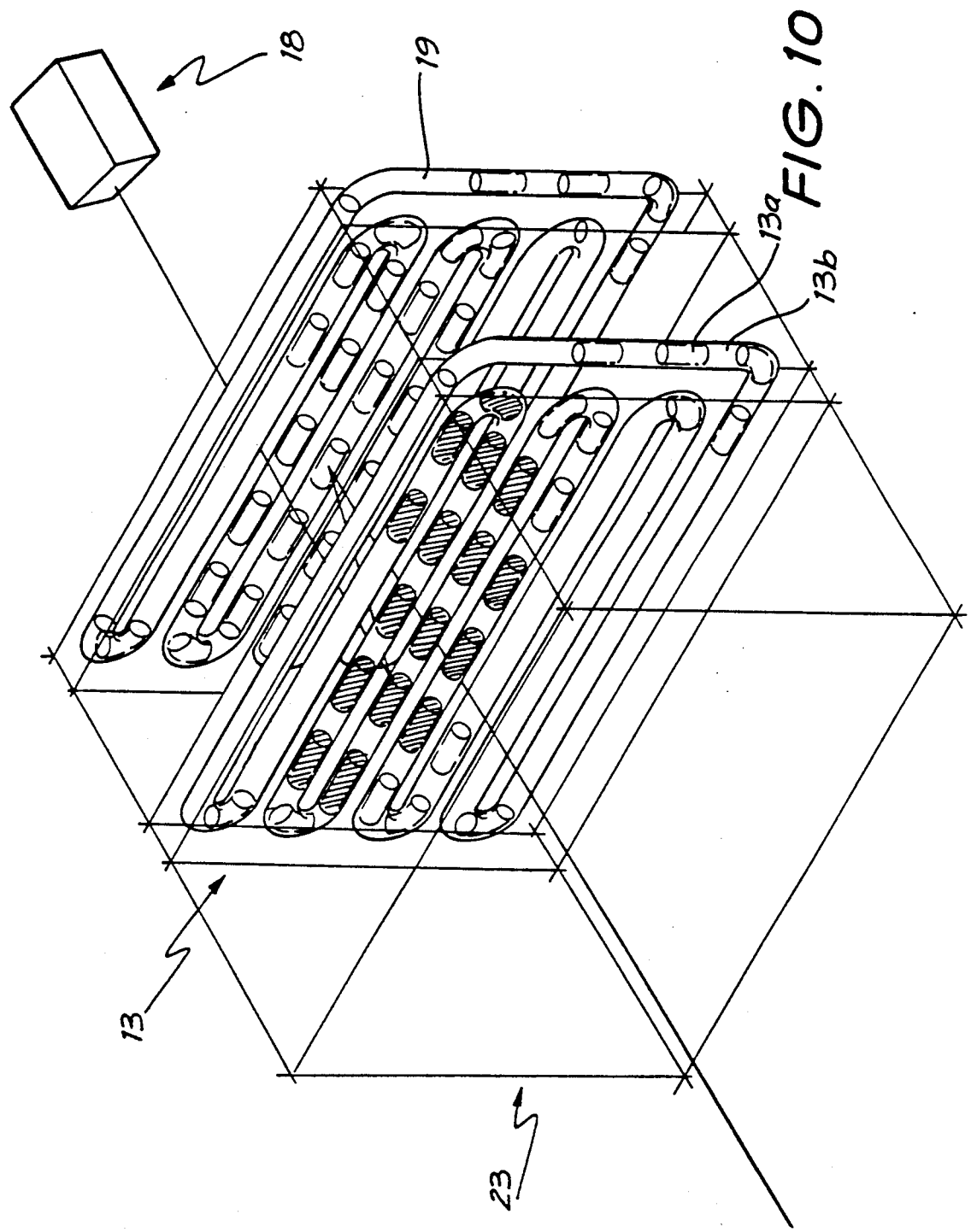
FIG. 10 is a similar view of yet another embodiment of the invention.

In FIG. 10 an arrangement is shown in which the screen 13 and mirror 19 are each formed by a continuous tube containing alternating transparent and opaque "beads" of a solid or liquid material. The "beads" are pumped through the respective tubes in synchronism to produce the appropriate transposition of the transparent "beads" and the opaque or reflective "beads" as the case may be.

Figure 11:
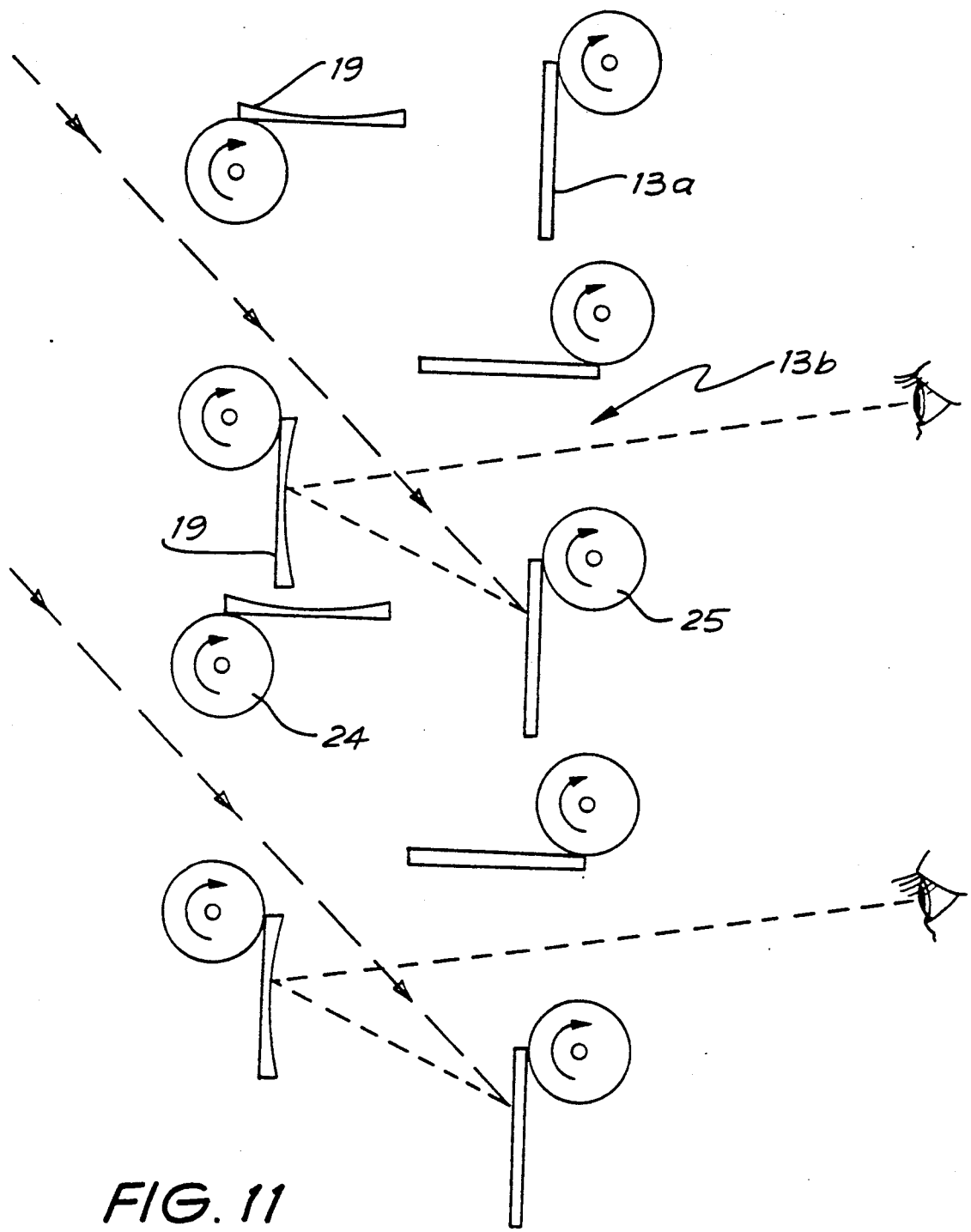
FIG. 11 is a vertical sectional view through a further embodiment of the invention.

FIG. 11 shows an arrangement in which the screen 13 and the mirror 19 are each formed from an array of slats which are each mounted at each end to extend tangentially from a cylindrical bush 24 and 25 respectively. The bushes 24, 25 are rotated about their longitudinal axes to cause the slats of the screen 13 and the mirror 19 to rotate about the said longitudinal axis. This rotation causes the alternate creation of screen portions 13a and transparent portions 13b and similary causes the mirror to act as a partial mirror. The projector 18 causes the formation of an image on the face of the screen portions 13a distal to the window. This image is reflected by the mirror 19 to the eye of a viewer. The slats are rotated at sufficient speed that the screen 13 is not visible to the viewer who only sees the reflected image as a continuous scene.

Experiments have shown that the invention is capable of providing a scene in a window in which there is no discernible screen upon which imagery is projected and the image appears in space grain free and distortion free from any angle.

The embodiments of the invention described above are given by way of example only to assist in our understanding of the nature of the invention.

We claim:

1. A screen simulator window comprising, means defining a window aperture through which a scene may be viewed; a partial screen arranged immediately behind the window, the screen consisting of alternate opaque screen portions and transparent portions; means to cause adjacent opaque screen portions and transparent portions to be transposed at a speed such that the presence of the screen is not apparent to the eye of a viewer; rear surfaces of the opaque screen portions extending away from the window being suitable for the reception of a projected image; a projector arranged to project a scene upon said surfaces of the opaque screen portions so that light from the projector is not directly visible to a viewer of the window, the projected scene appearing on the rear surface of the opaque screen portions; and a mirror arranged behind the partial screen viewable through the window, the scene projected onto the partial screen being visible in the mirror through the window.

2. A screen simulator window as claimed in claim 1 in which the screen comprises a plurality of spaced apart slats comprising the opaque screen portions and defining between them a series of opening comprising the transparent portions.

3. A screen simulator window as claimed in claim 1 in which the screen comprises a continuous opaque film with an array of spaced apart cut outs comprising the transparent portions.

4. A screen simulator window as claimed in claim 1 in which the screen comprises a rotating disc having a series of opaque segments comprising the opaque screen portions and being separated by gaps or transparent segments comprising the transparent portions.

5. A screen simulator window as claimed in claim 1 in which the screen comprises an array of parallel slats each mounted to rotate about a longitudinal axis parallel to its own longitudinal axis but lying outside the slat.

6. A screen simulator window as claimed in claim 1 in which the mirror is a moving mirror having sequential reflective and non-reflective portions and in which the alternating non-reflective portions of the mirror are in register with the screen portions of the screen such that light from the projector when shining through the mirror is not directly visible to a viewer of the window.

7. A screen simulator window as claimed in claim 1 in which the mirror is non-planar so as to have lens properties.

8. A screen simulator window as claimed in claim 1 in which a lens is interposed between the screen and the window.

9. A screen simulator window as claimed in claim 1 in which the screen and the mirror lie in substantially parallel planes in side by side array.

* * * * *